US011948096B2

(12) United States Patent
Zhou et al.

(10) Patent No.: US 11,948,096 B2
(45) Date of Patent: Apr. 2, 2024

(54) ADAPTIVELY ADJUSTING INFLUENCE IN FEDERATED LEARNING MODEL UPDATES

(71) Applicant: International Business Machines Corporation, Armonk, NY (US)

(72) Inventors: Yi Zhou, San Jose, CA (US); Ali Anwar, San Jose, CA (US); Nathalie Baracaldo Angel, San Jose, CA (US); Hekio H. Ludwig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 16/818,537

(22) Filed: Mar. 13, 2020

(65) Prior Publication Data

US 2021/0287114 A1  Sep. 16, 2021

(51) Int. Cl.
  *G06F 17/00* (2019.01)
  *G06N 3/082* (2023.01)
  *G06N 5/04* (2023.01)
  *G06N 20/20* (2019.01)

(52) U.S. Cl.
  CPC .............. *G06N 5/04* (2013.01); *G06N 3/082* (2013.01); *G06N 20/20* (2019.01)

(58) Field of Classification Search
  CPC ........... G06N 5/04; G06N 20/20; G06N 3/082
  USPC .............................................................. 706/12
  See application file for complete search history.

(56) References Cited

U.S. PATENT DOCUMENTS

| | | | | |
|---|---|---|---|---|
| 11,227,050 | B1* | 1/2022 | Gates | G06F 21/56 |
| 2002/0198688 | A1* | 12/2002 | Feldman | G06F 17/18 |
| | | | | 702/189 |
| 2016/0103907 | A1* | 4/2016 | Bingham | G06F 16/9535 |
| | | | | 707/722 |
| 2018/0089587 | A1 | 3/2018 | Suresh et al. | |
| 2019/0050749 | A1 | 2/2019 | Sanketi et al. | |
| 2019/0138940 | A1 | 5/2019 | Feuz et al. | |
| 2019/0171978 | A1 | 6/2019 | Bonawitz | |
| 2019/0310635 | A1* | 10/2019 | Hazard | G06N 20/00 |
| 2019/0340534 | A1* | 11/2019 | McMahan | G06F 17/18 |
| 2019/0384790 | A1* | 12/2019 | Bequet | G06N 3/084 |
| 2019/0385092 | A1* | 12/2019 | Benke | G06N 20/00 |

(Continued)

FOREIGN PATENT DOCUMENTS

| | | |
|---|---|---|
| CN | 109492420 A | 3/2019 |
| CN | 109635462 A | 4/2019 |

OTHER PUBLICATIONS

Wang, Measure Contribution of Participants in Federated Learning (Year: 2019).*

(Continued)

*Primary Examiner* — Paul C McCord

(74) *Attorney, Agent, or Firm* — Patterson + Sheridan, LLP

(57) ABSTRACT

Techniques for improved federated learning are provided. One or more queries are issued to a plurality of participants in a federated learning system, and one or more replies are received from the plurality of participants. A first aggregated model is generated based on the one or more relies and a first influence vector. Upon determining that a predefined criterion is satisfied, a second influence vector modifying a weight of a first participant of the plurality of participants is generated. A second aggregated model is generated based on the one or more replies and the second influence vector.

17 Claims, 8 Drawing Sheets

(56) References Cited

U.S. PATENT DOCUMENTS

2021/0097381 A1* 4/2021 Daykin .................... G06N 3/08
2022/0343167 A1* 10/2022 Chawla .................... G06N 5/01

OTHER PUBLICATIONS

Google AI Blog. (2020). Federated Learning: Collaborative Machine Learning without Centralized Training Data. [online] Available at: https://ai.googleblog.com/2017/04/federated-learning-collaborative.html [Accessed Mar. 5, 2020].

Zhao, Yue, et al. "Federated Learning with Non-IID Data." arXiv preprint arXiv:1806.00582 (2018).

Shiqiang Wang, Tiffany Tuor, Theodoros Salonidis, Kin K. Leung, Christian Makaya, Ting He, Kevin Chan, "Adaptive Federated Learning in Resource Constrained Edge Computing Systems," arXiv:1804.05271v3 [cs.DC] Feb. 17, 2019, 20 pages.

Felix Sattler, Simon Wiedemann, Klaus-Robert Müller and Wojciech Samek, "Robust and Communication—Efficient Federated Learning from Non-IID Data," arXiv:1903.02891v1 [cs.LG] Mar. 7, 2019, 17 pages.

Chengjie Li, Ruixuan Li, Pan Zhou, Haozhao Wang, Yuhua Li, Song Guo, Keqin Li,"Gradient Scheduling with Global Momentum for Non-IID Data Distributed Asynchronous Training," Apr. 23, 2019.

Blanchard et al.,"Machine Learning with Adversaries: Byzantine Tolerant Gradient Descent," 31st Conference on Neural Information Processing Systems (NIPS 2017), 11 pages.

Bonawitz, K. et al., (2019). Towards federated learning at scale: System design. arXiv preprint arXiv:1902.01046.

Bagdasaryan, E. et al., (2019). How to backdoor federated learning. arXiv preprint arXiv:1807.00459.

Authors et al., "Ranking and Automatic Selection of Machine Learning Model," IP.com, IP.com No. IPCOM000252275D, dated Jan. 3, 2018, pp. 1-34.

* cited by examiner

ADAPTIVELY ADJUSTING INFLUENCE IN FEDERATED LEARNING MODEL UPDATES

BACKGROUND

The present disclosure relates to federated learning, and more specifically, to adaptively adjusting participant influence for model updates.

Machine learning (ML) has been widely applied in industry and academia to a wide variety of domains. While traditional ML approaches depend on a centrally managed training data set, additional work has recently involved in federated learning (FL), where participants cooperatively train a model using their own individual data. Privacy considerations drive interest in decentralized learning frameworks in which multiple participants collaborate to train a ML model, as they typically do not wish to share their respective training data sets. FL can utilize a decentralized process that can scale to thousands of participants. As the training data does not leave each participant's domain, FL is suitable for use cases that are sensitive to data sharing. This can include health care, financial services and other scenarios of particular privacy sensitivity or subject to regulatory mandates.

In some FL systems, each participant trains a model locally and exchanges the model parameters with others (e.g., via a centralized aggregator), while withholding the privacy-sensitive training data. Typically, the aggregator combines these parameters in order to create aggregated models. However, existing systems cannot respond to potentially malicious participants that wish to harm the models. For example, some parties may provide inaccurate or poisoned parameters (e.g., weights taken from a model with biases or known vulnerabilities), in the hopes that the final aggregated model(s) will also exhibit these weaknesses. Current systems cannot dynamically respond to such attacks.

Relatedly, a significant benefit of FL is that the various parties inherently have heterogeneous data. That is, some parties may have high quality data (e.g., a large number of typical exemplars with accurate labels) while others have low quality data (e.g., a smaller number of exemplars, and/or data with inaccurate or insufficient labels). Despite this, existing systems treat all responses are equally throughout the training process. Ignoring this data heterogeneity can lead to poor model performance (e.g., by providing too much weight for parties with poor data, and/or too little weight for parties with high quality data).

SUMMARY

According to some embodiments of the present disclosure, a method is provided. The method includes issuing one or more queries to a plurality of participants in a federated learning system; receiving one or more replies from the plurality of participants; generating a first aggregated model based on the one or more relies and a first influence vector; upon determining that a predefined criterion is satisfied, generating a second influence vector modifying a weight of a first participant of the plurality of participants; and generating a second aggregated model based on the one or more replies and the second influence vector. Advantageously, such an embodiment allows the system to dynamically generate influence vectors to respond to new information.

According to some embodiments of the present disclosure, any combination of the above embodiments can further include generating a third influence vector modifying the weight of the first participant; and generating a third aggregated model based on the one or more replies and the third influence vector, wherein the first influence vector assigns equal weight to each of the plurality of participants, wherein the second influence vector assigns additional weight to the first participant, and wherein the third influence vector assigns less weight to the first participant. Advantageously, such an embodiment enables the system to experiment with both increasing and decreasing a participant's influence, which allows it to more-quickly identify optimal weightings and generate better models.

According to some embodiments of the present disclosure, any combination of the above embodiments can further include an embodiment wherein determining that the predefined criterion is satisfied comprises identifying a change in one or more conditions of the first participant based on a reply from the first participant. Advantageously, such an embodiment allows the system to dynamically monitor respondent's statuses based on their replies, and quickly respond to changing conditions.

According to some embodiments of the present disclosure, any combination of the above embodiments can further include an embodiment wherein determining that the predefined criterion is satisfied comprises receiving, from a third party, new information about the first participant. Advantageously, such an embodiment enables the system to dynamically respond to new information, such as security alerts, that can affect the optimal influence of the given participant.

According to some embodiments of the present disclosure, any combination of the above embodiments can further include an embodiment wherein determining that the predefined criterion is satisfied comprises determining that a reply from the first participant is an outlier, as compared to replies from other participants in the plurality of participants. Advantageously, such an embodiment enables the system to dynamically identify model updates which may be particularly useful and/or harmful, based on the fact that they differ from the other replies. This yields better aggregated models.

According to some embodiments of the present disclosure, any combination of the above embodiments can further include an embodiment wherein determining that the reply from the first participant is an outlier comprises: comparing the reply from the first participant to the replies from the other participants; and determining that a difference between the reply from the first participant and the replies from the other participants exceeds a predefined threshold. Advantageously, such an embodiment enables the system to dynamically identify model updates which may be particularly useful and/or harmful, based on the fact that they differ from the other replies. This yields better aggregated models.

According to some embodiments of the present disclosure, any combination of the above embodiments can further include: determining a size of a set of aggregated models being maintained; upon determining that the size exceeds a predefined maximum value: evaluating each respective aggregated model to determine a respective model performance; and pruning one or more of the set of aggregated models based on the respective model performances. Advantageously, such an embodiment allows the system to dynamically prune underperforming models to identify accurate models while minimizing system resource usage.

According to some embodiments of the present disclosure, any combination of the above embodiments can further include an embodiment wherein evaluating each respective aggregated model comprises: transmitting, to at least one participant of the plurality of participants, the set of aggregated models; and requesting that the at least one participant evaluate the set of aggregated models using local data. Advantageously, such an embodiment enables the system to accurately determine the performance of each model while relying on the data local to each individual participant. Thus, the aggregating system need not maintain its own training or evaluation data.

According to a different embodiment of the present disclosure, any combination of the above-discussed embodiments can be implemented by one or more computer-readable storage media. The computer-readable storage media collectively contain computer program code that, when executed by operation of one or more computer processors, performs an operation. In embodiments, the operation performed can correspond to any combination of the above methods and embodiments.

According to yet another different embodiment of the present disclosure, any combination of the above-discussed embodiments can be implemented by a system. The system includes one or more computer processors, and one or more memories collectively containing a program which, when executed by the one or more computer processors, performs an operation. In embodiments, the operation performed can correspond to any combination of the above methods and embodiments.

DETAILED DESCRIPTION

Embodiments of the present disclosure provide techniques to dynamically and adaptively modify participant influence during training in an FL environment. This adaptation can significantly improve model results by dynamically reducing the influence of parties with poor data and/or malicious parties and/or increasing the influence of parties with high quality data. By treating each participant uniquely, embodiments of the present disclosure can yield more accurate and reliable models.

In some embodiments, the FL system relies on a set of participants, each with its own training data, to provide model updates. These parties, however, are typically not alike, both from a data perspective as well as from an entity perspective. For example, from a data perspective, various parties can have widely varied quantities and qualities of data. Similarly, the speed with which each entity can collect new data varies significantly, Further, it is typically unknown whether each party's data is independent and identically distributed (IID). In machine learning (ML) systems, it is highly preferable to rely on IID data.

In addition to data heterogeneity, the participants themselves often differ in a number of ways that can cause inaccuracies if they are all treated alike. For example, the response rate of each party can vary, and the network quality and computational resources available at each participant differs. These technical differences can yield potential problems in FL environments. Similarly, the reputation and prestige of each party may affect how their responses are treated. For example, a well-known large corporation may be relatively trusted, while unknown private entities are less trusted. Each of these party and data attributes affect the quality of their model updates. Without considering such data, therefore, the generated aggregate models suffer.

In some embodiments, an influence vector (also referred to herein as a weight vector) is used to allocate relative weights to each participant when aggregating model updates. In some embodiments, the influence vector is initialized such that each participant receives equal weight. In at least one embodiment, the influence vector is initialized to provide differing weights depending on other data, such as the reputation of each party. In embodiments, during training, the system monitors for predefined triggers and dynamically adjusts the influence of participants if the criteria are satisfied. By iteratively doing so and evaluating the resulting models, the system can identify reliable models and, by analyzing the corresponding influence vector, determine which participants are reliable and/or trustworthy. Ultimately, embodiments of the present disclosure yield improved ML models.

Figure 1:
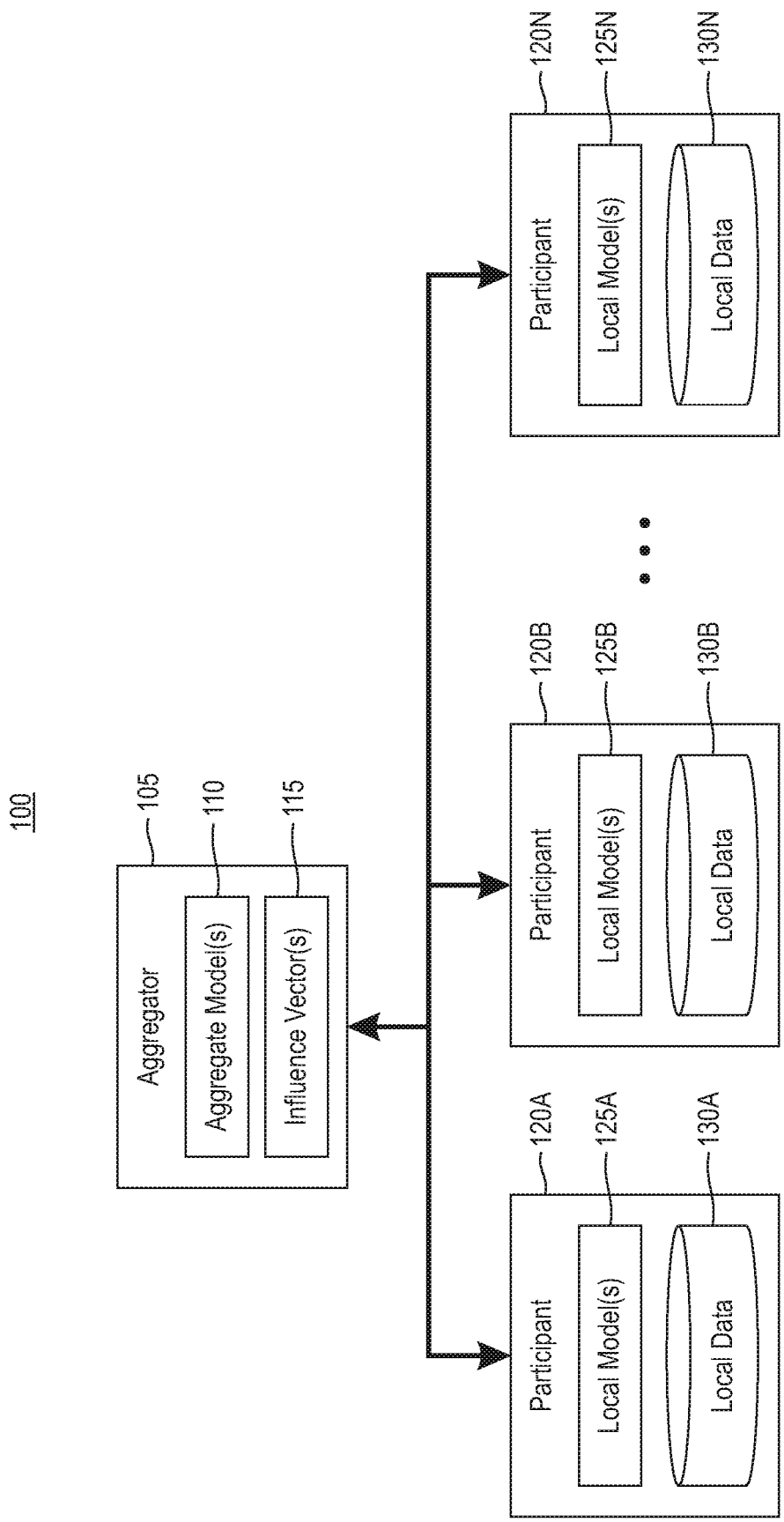
FIG. 1 depicts a system for federated learning configured to adaptively modify participant influence during training.

FIG. 1 depicts a System 100 for federated learning configured to adaptively modify participant influence during training. In the illustrated System 100, an Aggregator 105 manages a set of one or more Aggregate Models 110 and a corresponding set of Influence Vectors 115. In an embodiment, each Influence Vector 115 indicates a respective weight for each Participant 120A-N. For example, with N participants, each Influence Vector 115 may take the form of $\{w_1, w_2, \ldots, w_n\}$, where $w_1$ is the weight of a first participant, $w_2$ is the weight of a second, and so on. In one embodiment, each weight is normalized to a predefined range (e.g., from zero to one).

Each Aggregate Models 110 generally corresponds to an ML model (such as a neural network) that is generated by aggregating model parameters provided by one or more Participants 120. The particular aggregation for a given Aggregate Model 110 (e.g., the replies to include, as well as the relative weights of each) is defined by the corresponding Influence Vector 115. As illustrated, the Aggregator 105 is communicatively coupled with a number of Participants 120A-N. The communication link can include any number of wired and/or wireless links, and may include the Internet. Although a single Aggregator 105 is depicted, in embodiments, there may be any number of Aggregators 105. Similarly, although three Participants 120A-N are included in the illustrated embodiment, there may be any number of Participants 120.

As illustrated, each Participant 120A-N maintains a respective set of one or more Local Models 125A-N, as well as a respective set of Local Data 130A-N. The Local Data 130A-N for each Participant 120A-N generally corresponds to training data generated and/or maintained by the respective Participant 120A-N. This training data may include any suitable data used to train any type of ML models. For example, the Local Data 130 may include labeled exemplars. In an embodiment, each Participant 120A-N uses its own Local Data 130A-N to train and/or refine its Local Model(s) 125A-N. The Participants 120A-N can then report their model updates (e.g., weights or other parameters) to the Aggregator 105. This process may be iteratively repeated any number of times.

In some embodiments, the Aggregator 105 transmits queries to each Participant 120A-N requesting model updates. In an embodiment, this query includes a request for the updated gradients, weights, and/or parameters of the Local Model 125A-N. In some embodiments, the query specifies one or more model parameters for the Aggregate models 110. In at least one embodiment, the Aggregator 105 further requests information about one or more specific labels or classes. For example, the Aggregator 105 may ask each Participant 120A-N to report the number of exemplars corresponding to the class that it has in its Local Data 130A-N.

Upon receiving a query, in an embodiment, each Participant 120 can generate a corresponding reply including computed gradients and/or new model parameters, based on the received parameters for the Aggregate Model(s) 110 and its Local Data 130. The Aggregator 105 collects these replies, and aggregates them using one or more Influence Vectors 115 to update one or more Aggregate Models 110.

In an embodiment, the System 100 may iterate through any number of training repetitions (also referred to as epochs), where each epoch includes a query and response to and from one or more Participant(s) 120. In some embodiments, for each epoch, the Aggregator 105 checks whether one or more predefined trigger criteria are satisfied. These can include, for example, identified changes in conditions for one or more Participants 120 (e.g., a faster or slower response time than normal), new information about one or more Participants 120 (such as a security alert indicating potential concerns for the party), a new Participant 120 joining the FL system, and the like. In some embodiments, the trigger criteria includes determining that a reply from one or more Participants 120 is an outlier. This may include determining the reply is an outlier as compared to other replies from the Participant 120, as well as determining whether the reply is an outlier as compared to the replies of the other Participants 120.

In embodiments, if a trigger condition is identified, the Aggregator 105 generates one or more new Influence Vectors 115. In one embodiment, the Aggregator 105 generates a new Influence Vector 115 that reduces the weight of the Participant 120 that triggered the condition. In another embodiment, the new Influence Vector 115 increases the weight of the Participant 120 that triggered the condition. In still another embodiment, the Aggregator 105 generates two new Influence Vectors 115: one that reduces the weight of the Participant 120, and one that increases the weight of the Participant 120. In an embodiment, the Aggregator 105 then generates a new Aggregate Model 110 for each of the new Influence Vectors 115.

In some embodiments, the Aggregator 105 can evaluate the set of Aggregate Models 110 in order to identify those which should be pruned. For example, upon generating new Aggregate Models 110, the Aggregator 105 may evaluate each model and prune one or more of the lowest-performing models. In another embodiment, the Aggregator 105 is configured to maintain a predefined maximum number of models. If this number is reached, the Aggregator 105 can then evaluate and prune one or more models. By utilizing this iterative process, dynamically modifying the weight of each Participant 120 and evaluating the resulting Aggregate Models 110, the Aggregator 105 is able to generate improved models that are more accurate, more reliable, and better able to account for party heterogeneity.

Figure 2:
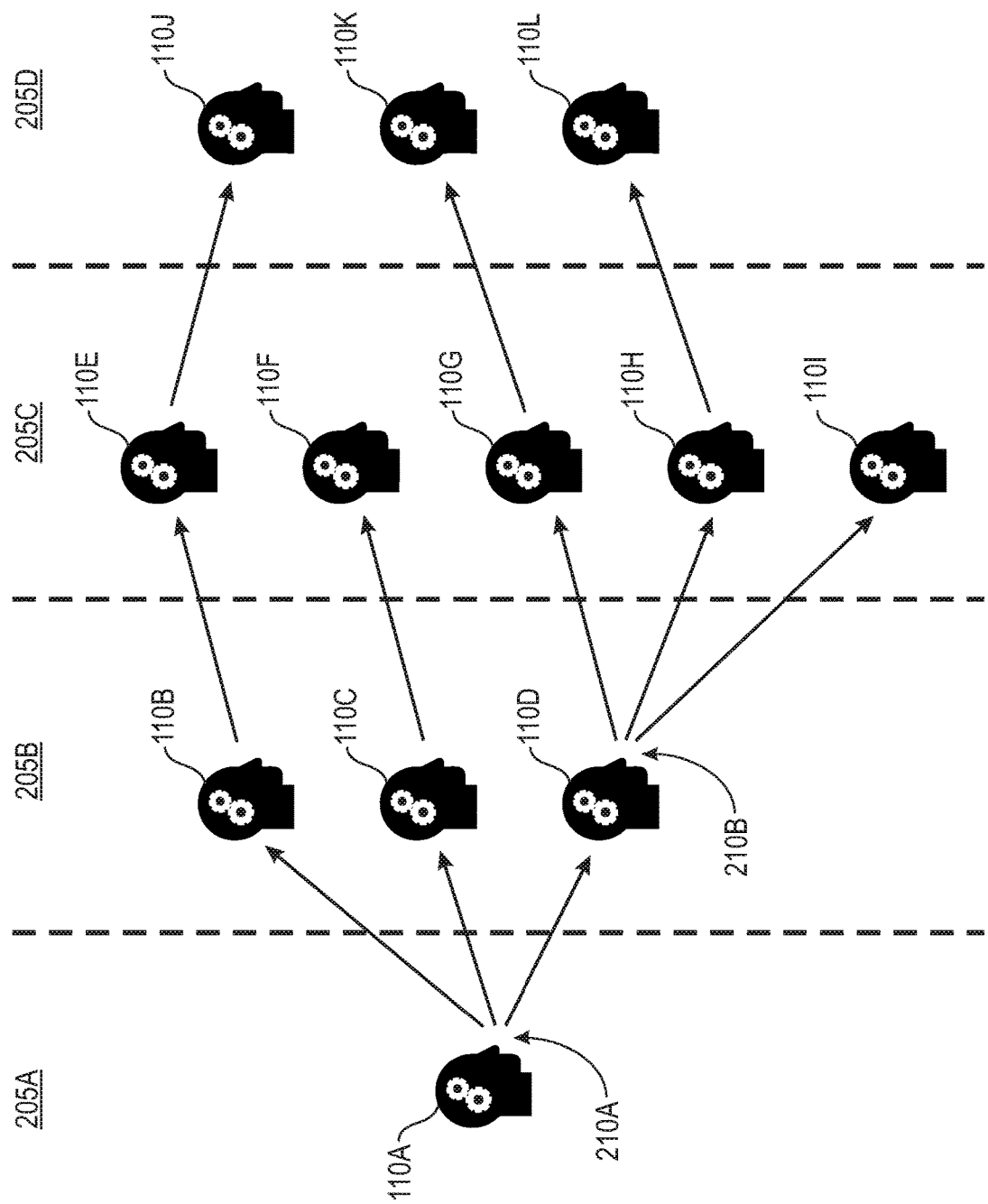
FIG. 2 illustrates a series of training and evaluation epochs for machine learning models generated adaptive influence in a federated learning environment, according to one embodiment disclosed herein.

FIG. 2 illustrates a series of training and evaluation epochs for machine learning models generated adaptive influence in a federated learning environment, according to one embodiment disclosed herein. In the illustrated embodiment, in the first Epoch 205A, a single Aggregate Model 110A is maintained. In an embodiment, the Aggregate Model 110A is generated based on a corresponding Influence Vector 115A. As indicated by the Arrow 210A, the Aggregator 105 has also determined that one or more trigger criteria are satisfied. For example, the Aggregator 105 may have received new information about one or more Participants 120, determined that one reply was an outlier, and the like.

In response to this trigger, as illustrated, the Aggregator 105 then generates three new Influence Vectors 115, and trains three new Aggregate Models 110B-D. In one embodiment, as discussed above, the Aggregator 105 generates one new Influence Vector 115 to increase the weight of the relevant Participant 120, and a second new Influence Vector 115 to decrease its weight. For example, suppose there are three Participants 120, and the initial Influence Vector 115 used to generate the Aggregate Model 110A gave equal weight to each Participant (e.g., $$\left\{\frac{1}{3}, \frac{1}{3}, \frac{1}{3}\right\}).$$

Upon determining that the first Participant 120 has triggered one or more criteria, the Aggregator 105 may generate a first new Influence Vector 115 boosting the Participant 120 weight (such as by incrementing the denominator of all weights by one, and incrementing the numerator of the relevant Participant 120 by one). In such an embodiment, this boosted Influence Vector 115 is $$\left\{\frac{2}{4}, \frac{1}{4}, \frac{1}{4}\right\}.$$

In this way, the aggregate weight of all parties remains equal to one. Further, in one embodiment, to generate the reduced weight, the Aggregator 105 sets the weight of the offending Participant 120 to zero, and decrements the denominator of all other weights. Continuing the above example, this reduced Influence Vector 115 is $$\left\{0, \frac{1}{2}, \frac{1}{2}\right\}.$$

In one embodiment, the Aggregator 105 generates the new Aggregate Models 110 in the same Epoch 205A (e.g., using the same set of replies). In another embodiment, the system proceeds to the next Epoch 205B, and the new Aggregate Models 110 are generated using the next set of replies. In the illustrated embodiment, this second Epoch 205B includes Aggregate Models 110B-D. For example, the Aggregate Model 110B may correspond to the boosted Influence Vector 115, the Aggregate Model 110C may correspond to the original Influence Vector 115 used to generate Aggregate Model 110A, and the Aggregate Model 110D may correspond to the reduced weight Influence Vector 115. In an embodiment, the Aggregator 105 then similarly evaluates the data again to determine whether one or more predefined trigger criteria have been satisfied. As depicted by Arrow 210B, the Aggregator 105 has detected such a concern with respect to the Aggregate Model 110D.

For example, the Aggregator 105 may have determined that one or more replies for the Aggregate Model 110D are outliers. Note that the Participant 120 which triggered the criterion at Arrow 210B may or may not be the same party that triggered the Arrow 210A. As discussed above, in some embodiments, the Aggregate Model 110 transmits a separate query for each Aggregate Model 110. Each Participant 120 then generates a specific reply for each Aggregate Model 110. In the illustrated embodiment, however, no concerns are identified with respect to the Aggregate Models 110B and 110C. Thus, as illustrated, these Aggregate Models 110B and 110C are refined in the next Epoch 205C to generate Aggregate Models 110E and 110F, respectively, without generating new Influence Vectors 115. In response to detecting the anomaly at Arrow 210B, however, the Aggregator 105 again generates new Influence Vectors 115, and generates new Aggregate Models 110G-I using these new weight vectors.

In the illustrated embodiment, the Aggregator 105 is configured to maintain no more than five Aggregate Models 110. In Epoch 205C, this limit has been reached. In another embodiment, the Aggregator 105 may be configured to maintain three Aggregate Models 110. In Epoch 205C, therefore, this limit has been exceeded. Of course, in embodiments, the system may be configured to maintain any number of models. In one embodiment, this is a user-configurable threshold. Upon determining that the maximum threshold has been met and/or exceeded, in the illustrated embodiment, the Aggregator 105 evaluates each of the Aggregate Models 110E-I in the Epoch 205C, and selects one or more to be pruned.

In one embodiment, evaluating the Aggregate Models 110 includes providing, to one or more Participants 120, the model parameters, weights, or other data that can be used to recreate each model. Each Participant 120 can then use its own respective Local Data 130 to evaluate the model(s) it received, and return the results. For example, in one embodiment, this evaluation includes determining the current loss of each Aggregate Model 110, based on the Local Data 130. The Aggregator 105 can then aggregate these responses to determine relevant performance of each model (e.g., by averaging or finding the median loss of each, by computing one or more quantiles, and the like). In an embodiment, the Aggregator 105 then identifies and prunes the lowest-performing Aggregate Models 110. In one embodiment, the number of models to prune is determined based on the number of new models created each time triggering criteria are met, and/or based on the difference between the maximum number of models and the current number of models.

For example, in the illustrated embodiment, the Aggregator 105 generates two new models each time the criteria are satisfied. Thus, in the illustrated embodiment, the Aggregator 105 selects two models to be culled. Specifically, as illustrated, the Aggregator 105 has determined to prune the Aggregate Models 110F and 110I, based on determining that these were the worst-performing models (e.g., the models with the highest loss). In the illustrated embodiment, the Aggregator 105 then initiates the next training iteration and proceeds to the Epoch 205D, where the Aggregate Model 110E has been refined (e.g., based on responses from the Participants 120) to create an Aggregate Model 110J, the Aggregate Model 110G has been refined to yield an Aggregate Model 110K, and the Aggregate Model 110H has been updated to create an Aggregate Model 110L.

In embodiments, this iterative training process, including dynamically instantiating and pruning Aggregate Models 110, can continue for any period of time, and/or for any number of training Epochs 205. In one embodiment, the training terminates when predefined criteria are satisfied. This can include, for example, a maximum time, a maximum number of iterations, and the like. In some embodiments, the termination criteria can further include determining that one or more Participants 120 do not have any additional data for training, that the differences between the current Epoch 205 and the prior Epoch 205 are below a predefined threshold (e.g., indicating that the models have reached or nearly reached their maximum potential), that the best-performing model now exceeds predefined performance criteria, and the like.

Figure 3:
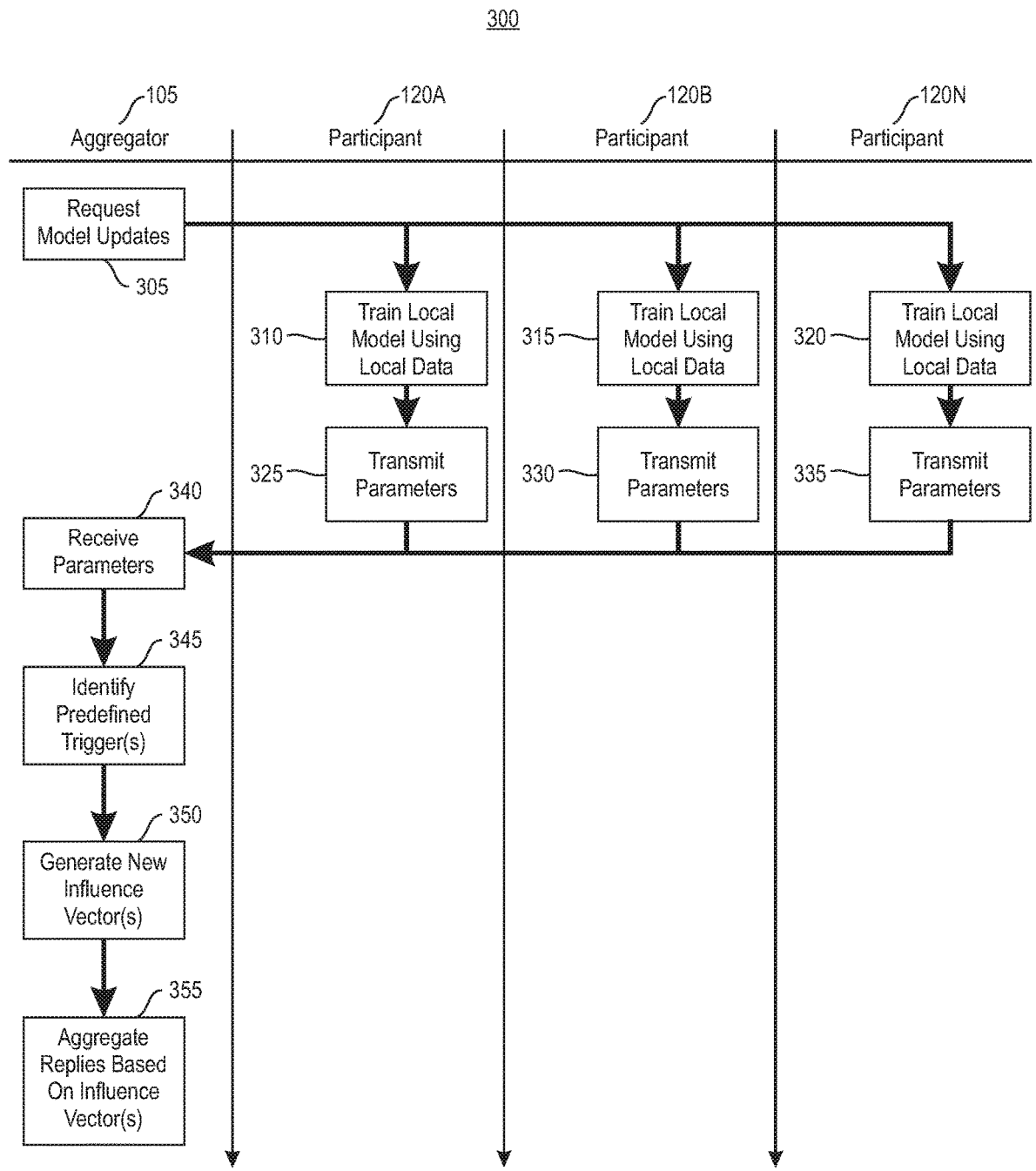
FIG. 3 illustrates a workflow for adaptively modifying participant influence while training machine learning models in a federated learning system, according to one embodiment disclosed herein.

FIG. 3 illustrates a workflow 300 for adaptively modifying participant influence while training machine learning models in a federated learning system, according to one embodiment disclosed herein. In the illustrated embodiment, a number of components are listed, along with a set of actions or operations performed by each component included on a timeline extending down the page. Although depicted as a sequential timeline for conceptual clarity, in embodiments, the operations depicted and described may occur any in order, including substantially simultaneously.

The workflow 300 begins at block 305 when an Aggregator 105 requests model updates for one or more aggregate models from one or more Participants 120. In one embodiment, this includes transmitting one or more queries to each Participant 120, where the queries specify one or more model parameters for one or more Aggregate Models 110. As illustrated by blocks 310, 315, and 320, upon receiving these requests, each Participant 120A-N trains and/or refines the model(s) locally using some subset of its Local Data 130. For example, for each Aggregate Model 110, each Participant 120 can compute the gradient(s) and/or new model parameters for the Aggregate Model 110 based on the received current parameters and its respective Local Data 130.

The workflow 300 then continues to blocks 325, 330, and 335, where each Participant 120 returns the updated parameters for each of the requested models to the Aggregator 105. Although depicted as occurring substantially simultaneously, there may of course be variances in their responses. For example, some Participants 120 may respond more quickly than others. At block 340, the Aggregator 105 collects these responses. In some embodiments, the Aggregator 105 waits until all Participants 120 (or a predefined minimum quorum) have responded. In another embodiment, the Aggregator 105 waits a predefined period of time prior to proceeding.

The workflow 300 then continues to block 345, where the Aggregator 105 identifies that one or more predefined triggers have occurred. Although depicted as occurring upon receiving the updates, in various embodiments, these triggers can be identified at any time. For example, in one embodiment, the Aggregator 105 aggregates the replies and refines the Aggregate Models 110 prior to identifying triggering events. In the illustrated embodiment, upon determining that one or more triggers have been satisfied, the workflow 300 proceeds to block 350, where the Aggregator 105 generates one or more new influence vectors.

In one embodiment, as discussed above, generating influence vectors includes identifying the Participant(s) 120 that caused the trigger, and either increasing the weight provided to that Participant 120, reducing the weight provided to that Participant 120, or generating two influence vectors where one increases the weight and the other decreases it. In embodiments, the predefined triggers can include a wide variety of criteria.

In one embodiment, the triggers can include determining that the conditions or state of one or more Participants 120 has changed. For example, if a Participant 120 responded more quickly or more slowly than it previously did in prior rounds of training (e.g., above a predefined threshold variance), the Aggregator 105 may determine that the Participant 120 conditions have changed enough to warrant generation of new influence vectors. In another embodiment, the predefined criteria include receiving new information about one or more Participants 120. For example, a security alert or article may be received (e.g., from a third party), and the Aggregator 105 may determine that there is reason to distrust the Participant 120 (e.g., because of a recent security breach) and/or allocate extra weight to the Participant 120 (e.g., because of a recent innovation or breakthrough the Participant 120 achieved).

In another embodiment, the trigger conditions can include a new Participant 120 wishing to join the federated learning. In such an embodiment, the Aggregator 105 generates a new influence vector that allows the new party's replies to be included in the aggregation, while maintaining the existing influence of the other parties. In still another embodiment, the trigger conditions include determining that the response from one or more Participants 120 is an outlier. For example, the Aggregator 105 may compute a score for each Participant 120 based on the received replies, and identify the party with the highest score as an outlier. In one embodiment, the score of a given participant can be computed based on the overall distance between the given participant's reply and replies from other participants. In another embodiment, the score can be computed based on the distance between the given participant's current reply and the last reply received from the given participant. In embodiments, any number and variety of triggers can be utilized.

Once the new influence vector(s) are generated, the workflow 300 proceeds to block 355, where the Aggregator 105 aggregates the replies in order to update the Aggregate Model(s) 110. In one embodiment, for a given Aggregate Model 110, the Aggregator 105 identifies the corresponding influence vector and uses it to aggregate the replies when updating the given model. This can be repeated for each Aggregate Model 110/influence vector pair, until all the models have been refined/updated/created. The training process can then begin anew.

Figure 4:
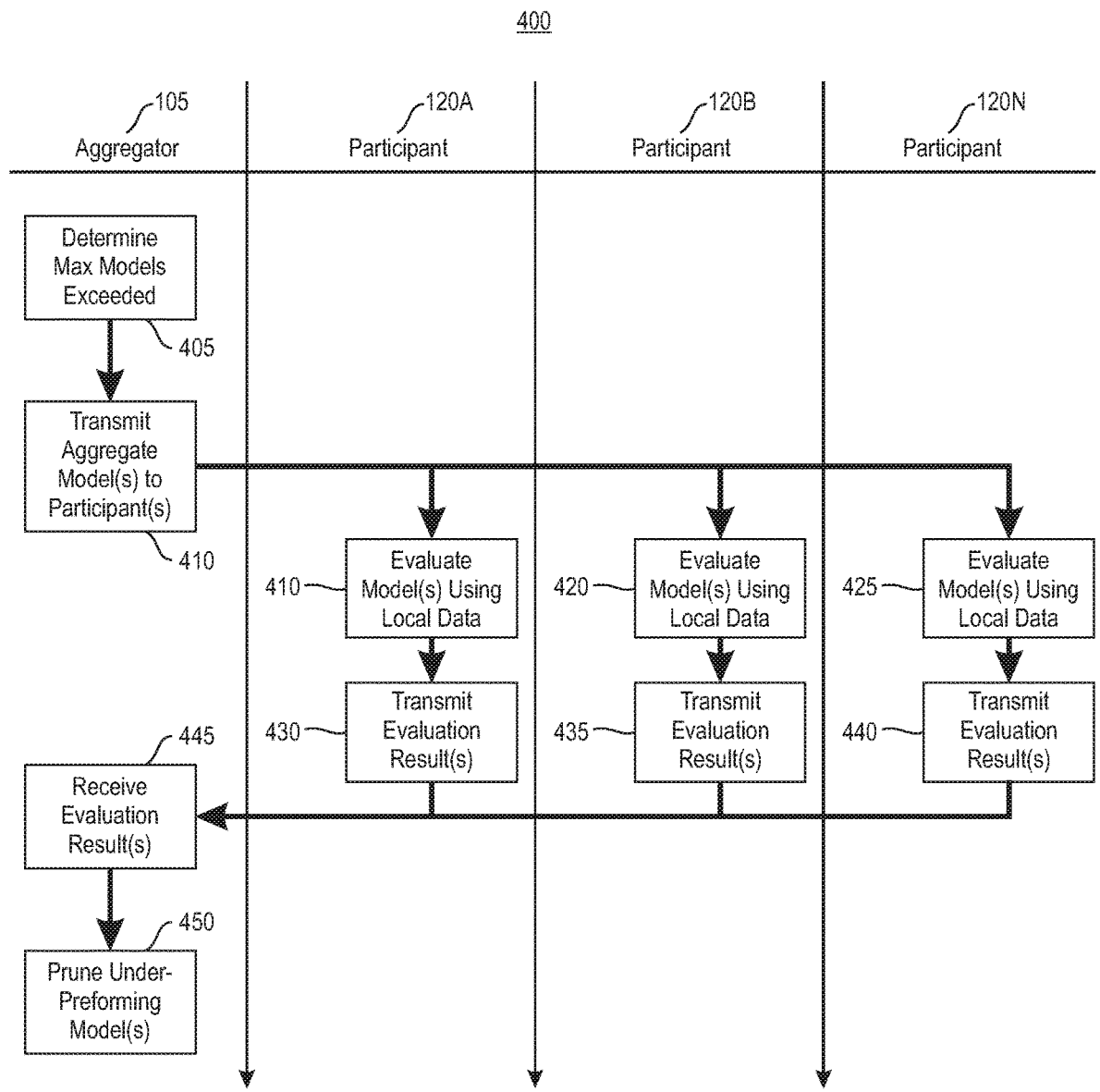
FIG. 4 illustrates a workflow for evaluating and pruning machine learning models in a federated learning environment, according to one embodiment disclosed herein.

FIG. 4 illustrates a workflow 400 for evaluating and pruning machine learning models in a federated learning environment, according to one embodiment disclosed herein. The workflow 400 begins at block 405, when the Aggregator 105 determines that the current number of Aggregate Models 110 being maintained by the system exceeds the predefined maximum value. In response, at block 410, the Aggregator 105 transmits the current set of Aggregate Models 110 (e.g., the parameters or weights needed to instantiate and/or evaluate each model) to the set of Participants 120.

At blocks 415, 420, and 425, each Participant 120 then evaluates the set of models using some subset of its Local Data 130. For example, each Participant 120 can compute the current loss of each model, based on its own data. At blocks 430, 435, and 440, the Participants 120 then transmit the evaluation results to the Aggregator 105. Although depicted as occurring substantially simultaneously, in embodiments, each Participant 120 may of course respond with varying latency or delay.

At block 445, the Aggregator 105 collects these performance metrics. Once a sufficient number of responses have been received and/or a predefined period has elapsed, the workflow 400 continues to block 450, where the Aggregator 105 identifies and prunes one or more under-performing models. To do so, the Aggregator 105 may aggregate the reported performance for each Aggregate Model 110, as reflected in the responses from the Participants 120, and cull the model(s) with the highest loss/lowest performance.

Figure 5:
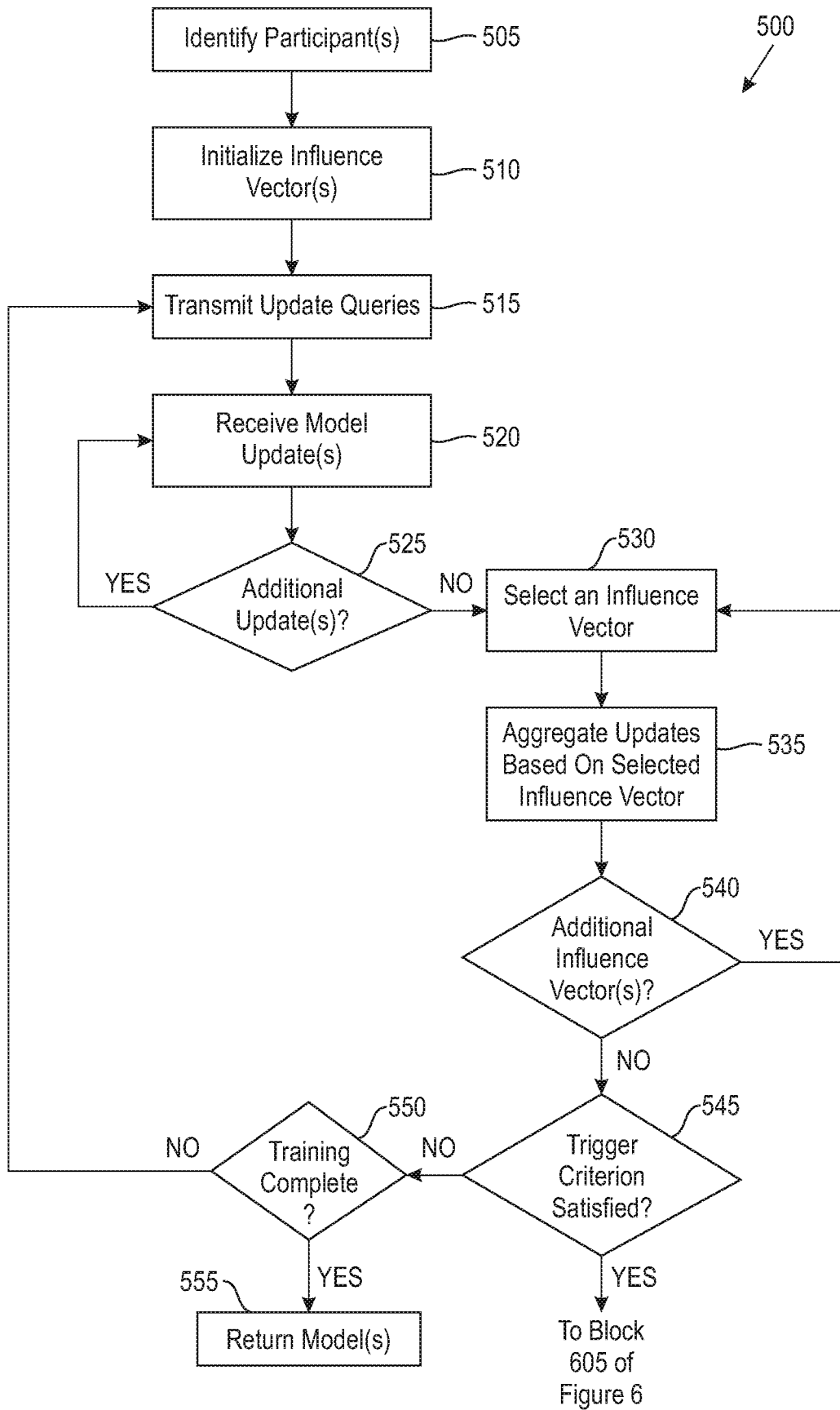
FIG. 5 is a flow diagram illustrating a method for iteratively training machine learning models in a federated learning system configured to provide adaptive influence modifications, according to one embodiment disclosed herein.

FIG. 5 is a flow diagram illustrating a method 500 for iteratively training machine learning models in a federated learning system configured to provide adaptive influence modifications, according to one embodiment disclosed herein. The method 500 begins at block 505, where an Aggregator 105 identifies a set of participants that wish to participate in the federated learning. At block 510, the Aggregator 105 initializes one or more influence vectors to begin the training. In one embodiment, the Aggregator 105 creates an influence vector providing equal weight to each identified participant (e.g., for N participants, the initial influence vector can specify weights of 1/N for each party).

In some embodiments, the Aggregator 105 additionally or alternatively generates influence vector(s) based on any known information about each identified participant. For example, in one embodiment, the Aggregator 105 requests and/or receives information about the training data maintained by each party (e.g., the amount of training data each participant has). In related embodiments, the Aggregator 105 may determine the reputation or other characteristics of the participants themselves (e.g., how large an entity they are, how trusted they are in the field, and the like). In an embodiment, the Aggregator 105 can then generate initial influence vector(s) reflecting this data, such as by providing extra weight to trusted participants, to participants with large amounts of training data, and the like. Similarly, the Aggregator 105 may generate influence vector(s) providing reduced weight to parties that are relatively unknown or not trusted, to parties with little data, to parties that did not respond to a request for more information, and the like.

The method 500 then continues to block 515, where the Aggregator 105 transmits one or more update queries to each identified participant. In one embodiment, as discussed above, each of the update queries includes the current model parameters and/or weights for one or more aggregate models maintained by the Aggregator 105. In one embodiment, a separate query is constructed for each such aggregate model. In another embodiment, a single query can specify parameters for multiple aggregate models. The method 500 proceeds to block 520, where the Aggregator 105 receives one or more model updates from one or more participants. In an embodiment, as discussed above, each participant can generally use its local training data to refine and/or train one or more models (e.g., the models corresponding to each set of received parameters). These updated parameters can then be returned to the Aggregator 105.

After receiving one or more replies, the method 500 continues to block 525, where the Aggregator 105 determines whether there are additional updates remaining. That is, the Aggregator 105 determines whether to continue to wait for more update(s), or to proceed with the training round. This determination may be based on a number of factors, including a minimum quorum of respondents, a maximum wait time, and the like. If the criteria are not satisfied, the method 500 returns to block 520 to receive more replies. Otherwise, the method 500 continues to block 530.

At block 530, the Aggregator 105 selects one of the influence vectors currently in use by the system. In some embodiments, the Aggregator 105 can maintain any number of influence vectors, where each influence vector corresponds to a particular aggregate model. At block 535, the Aggregator 105 aggregates the newly-received updates (at block 520) using the selected influence vector. For example, the Aggregator 105 may compute a weighted average set of updated parameters, by using the influence vector to determine the weight of each participant. These aggregated updated parameters can then be used to instantiate/update an aggregate model. The method 500 then proceeds to block 540.

At block 540, the Aggregator 105 determines whether there is at least one existing influence vector that has not yet been used to aggregate the newly-received replies. If so, the method 500 returns to block 530. In this way, the method 500 iteratively aggregates the same set of replies using differing weightings, in order to generate aggregate models that differ slightly based on the weight of each participant. If all of the influence vectors have been utilized, the method 500 proceeds to block 545, where the Aggregator 105 determines whether one or more predefined trigger criteria are satisfied.

If so, the method 500 proceeds to block 605 of FIG. 6, discussed in more detail below. As discussed above, the trigger criteria can include consideration any number of factors, including whether the participant conditions or states have changed, whether any new information about one or more participants has become available, whether any of the responses are determined to be outliers, and the like. If no triggers were identified, the method 500 continues to block 550. At block 550, the Aggregator 105 determines whether the training has completed.

In one embodiment, this includes determining whether the number of training iterations has met a predefined maximum value. In another embodiment, this includes comparing the updated model parameters to the immediately-prior model parameters for each aggregate model. If the differences are below a predefined threshold, the Aggregator 105 may determine that training is complete because the models are not significantly maturing or changing with additional rounds of training. In still another embodiment, the determination at block 550 includes evaluating the performance of each aggregate model, and determining whether the performance of one or more of the aggregate models exceeds predefined minimum criteria.

If the ending criteria are not satisfied, the method 500 returns to block 515 to begin the next training iteration. In this way, the method 500 iteratively trains and refines a set of aggregate models using a corresponding set of influence vectors. If the criteria are satisfied, however, the method 500 continues to block 555, where the Aggregator 105 returns one or more of the aggregate models. In one embodiment, the Aggregator 105 returns the current set of aggregate models (e.g., to a requesting entity, to the participants, etc.). In another embodiment, the Aggregator 105 evaluates the performance of each aggregate model (such as by requesting each participant to test the performance of each) and returns one or more of the best-performing models.

Figure 6:
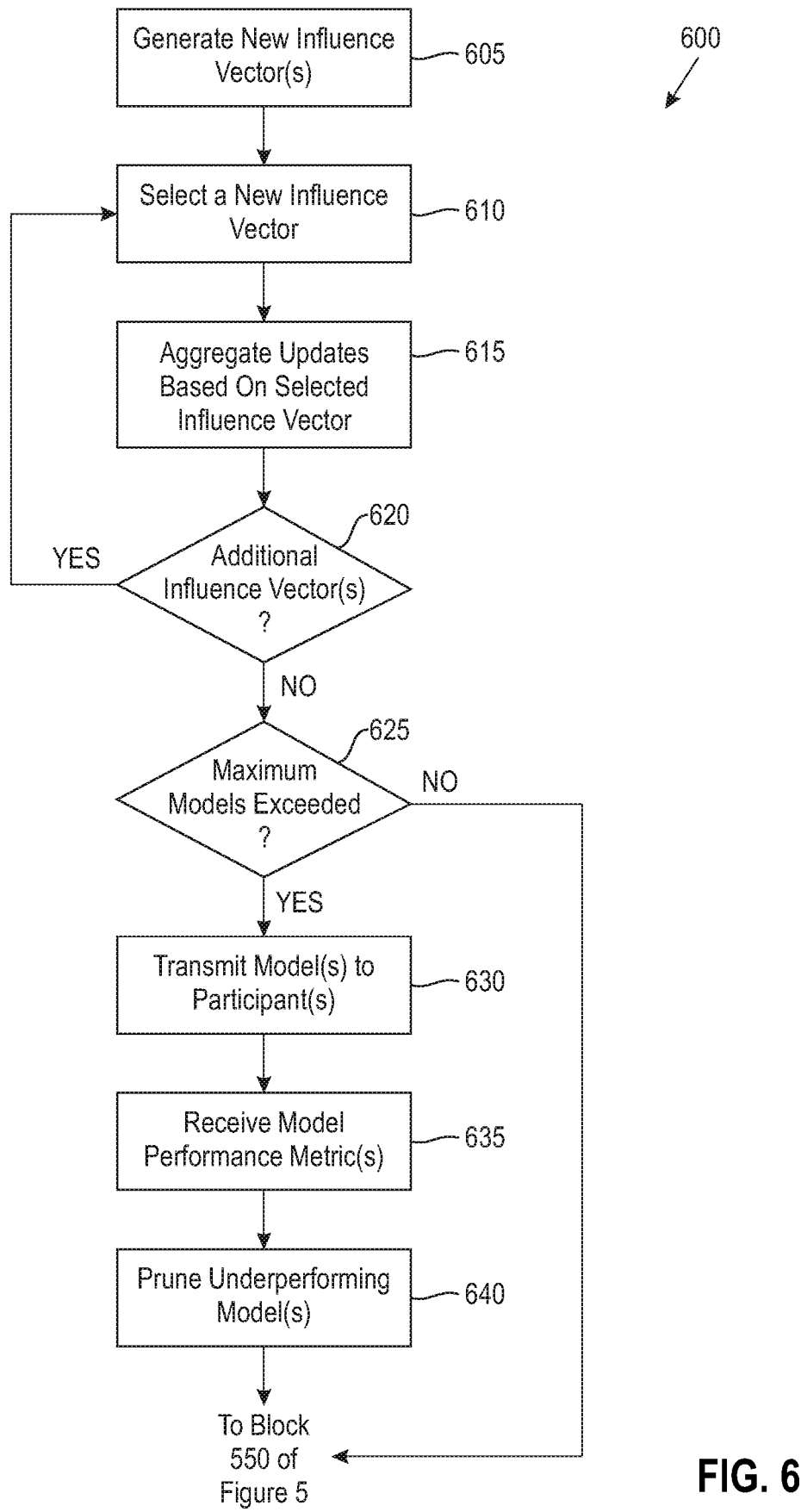
FIG. 6 is a flow diagram illustrating a method for dynamically modifying participant influence and evaluating machine learning models in a federated learning environment, according to one embodiment disclosed herein.

FIG. 6 is a flow diagram illustrating a method 600 for dynamically modifying participant influence and evaluating machine learning models in a federated learning environment, according to one embodiment disclosed herein. In one embodiment, the method 600 is performed upon determining (e.g., at block 545 of FIG. 5) that one or more trigger conditions are satisfied, and/or that one or more new influence vectors should be instantiated. The method 600 begins at block 605, where the Aggregator 105 generates one or more new influence vectors. In an embodiment, generating these new influence vectors includes identifying the participant(s) who caused the trigger to be satisfied. In some embodiments, the new influence vector(s) are generated based on the existing influence vector(s).

In one embodiment, for each respective participant that caused a trigger, the Aggregator 105 generates one or more new influence vectors that modify the weight of the respective participant. For example, if both a first and a second participant caused a trigger condition, the Aggregator 105 can generate a first new influence vector that increases the weight of the first participant (while keeping the weight of the second participant the same, as compared to the other uninvolved participants), a second new influence vector that decreases the weight of the first participant (while keeping the weight of the second participant the same, as compared to the other uninvolved participants), a third new influence vector that increases the weight of the second participant (while keeping the weight of the first participant the same, as compared to the other uninvolved participants), and a fourth new influence vector that decreases the weight of the second participant (while keeping the weight of the first participant the same, as compared to the other uninvolved participants).

In at least one embodiment, increasing the weight of a given participant includes identifying the current weight of the participant, and incrementing it by a predefined amount. In another embodiment, if the weights are expressed as fractions that sum to one, the Aggregator 105 can increment the numerator of the weight by a predefined amount, and increment the denominator of all of the weights by an equal amount. For example, if the current weight of the participant is $1/10$, the Aggregator 105 may change it to $2/11$, and adjust all of the other weights evenly from x/10 to x/11. In one embodiment, the Aggregator 105 determines the weight increase of the given participant (e.g., if the original weight is $1/10$ and the new weight is $2/11$, the increase is $9/110$), and decreases the other weights equally such that the overall sum is still one (by ensuring the sum of the other weights is decreased by $9/110$).

In some embodiments, decreasing the weight of a given participant includes identifying the current weight of the participant, and decrementing it by a predefined amount. In another embodiment, if the weights are expressed as fractions that sum to one, the Aggregator 105 can set the weight to zero, and decrement the denominator of all other weights by one. For example, if the current weight of the participant is $1/10$, the Aggregator 105 may change it to 0, and adjust all of the other weights evenly so that the sum of them equals one (e.g., by ensuring that the sum of all other weights is increased by increased by ¹/₁₀), such as by changing each of them from x/10 to x/9.

Once one or more new influence vectors are generated, the method 600 continues to block 610, where the Aggregator 105 selects one of the newly-generated influence vectors. At block 615, the Aggregator 105 aggregates the newly-received replies using the selected influence vector. This yields a new aggregate model. In one embodiment, if the influence vectors are generated based on existing vectors, the new aggregate model may be similar to or related to a prior model. Nevertheless, it is constructed using a new weighting of participants, which causes it to exhibit differing performance.

The method 500 then continues to block 620, where the Aggregator 105 determines whether there is at least one additional new influence vector that has not yet been used to instantiate an aggregate model. If so, the method 600 returns to block 610. Otherwise, the method 600 proceeds to block 625. At block 625, the Aggregator 105 determines whether the current number of aggregate models, including the refined models generated in block 535 of FIG. 5, as well as the newly-generated models from block 615, exceeds and/or meets a predefined maximum threshold. In another embodiment, the Aggregator 105 can determine whether the current number of influence vectors exceeds and/or meets the maximum threshold.

If the maximum value is not met or exceeded (depending on the particular implementation), the method 600 proceeds to block 550 of FIG. 5. In this way, the Aggregator 105 can iteratively refine and generate new models through multiple training epochs, until the maximum number of models has been met or exceeded. If the Aggregator 105 determines that the pruning criteria are satisfied, the method 600 continues to block 630. At block 630, the Aggregator 105 transmits each of the current aggregate models to one or more participants. That is, the Aggregator 105 transmits the current parameters and/or weights of each model to one or more participants. The Aggregator 105 also requests that the recipient participants evaluate the model(s) using their own local evaluation/training data.

At block 635, the Aggregator 105 receives responses from the participants, where the responses indicate one or more performance metrics for each aggregate model, based on the participant's local data. The method 600 then proceeds to block 640, where the Aggregator 105 prunes one or more underperforming models. In one embodiment, the Aggregator 105 identifies the underperforming models by aggregating the performance metrics transmitted by each participant for each model. This may include determining a simple average, a weighted average (e.g., weighted based on the corresponding influence vector for each model), and/or computing certain statistics, such as the median or quantiles, of the received performance metrics. In an embodiment, the number of models to be pruned can vary depending on a number of factors. For example, the Aggregator 105 may prune a number of models based on the number of new influence vectors generated in block 605. In another embodiment, the Aggregator 105 can prune a number of models to reduce the current set to less than the maximum threshold. After pruning the model(s), the method 600 returns to block 550 of FIG. 5.

Figure 7:
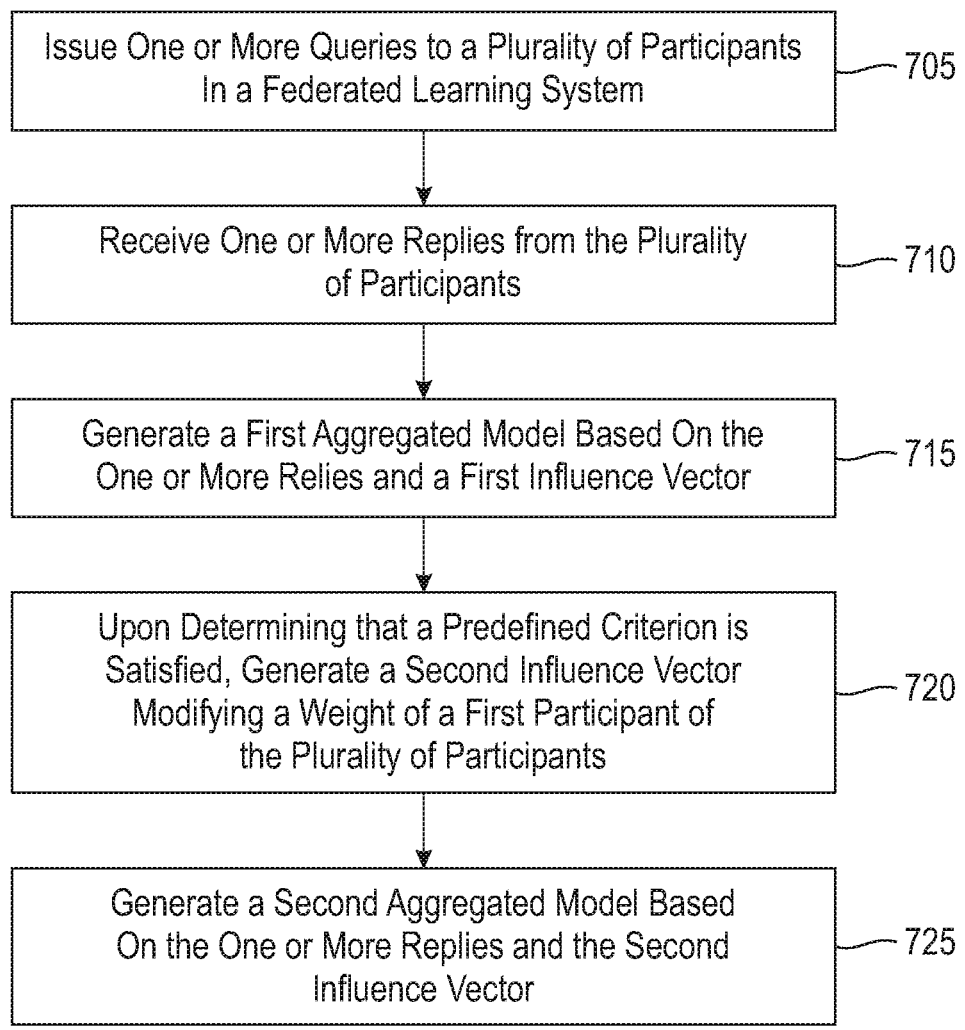
FIG. 7 is a flow diagram illustrating a method for adaptively managing a federated learning environment, according to one embodiment disclosed herein.

FIG. 7 is a flow diagram illustrating a method 700 for adaptively managing a federated learning environment, according to one embodiment disclosed herein. The method 700 begins at block 705, where an Aggregator 105 issues one or more queries to a plurality of participants in a federated learning system. At block 710, the Aggregator 105 receives one or more replies from the plurality of participants. The method 700 then proceeds to block 715, where the Aggregator 105 generates a first aggregated model based on the one or more relies and a first influence vector. At block 720, upon determining that a predefined criterion is satisfied, the Aggregator 105 generates a second influence vector modifying a weight of a first participant of the plurality of participants. Further, at block 725, the Aggregator 105 generates a second aggregated model based on the one or more replies and the second influence vector.

Figure 8:
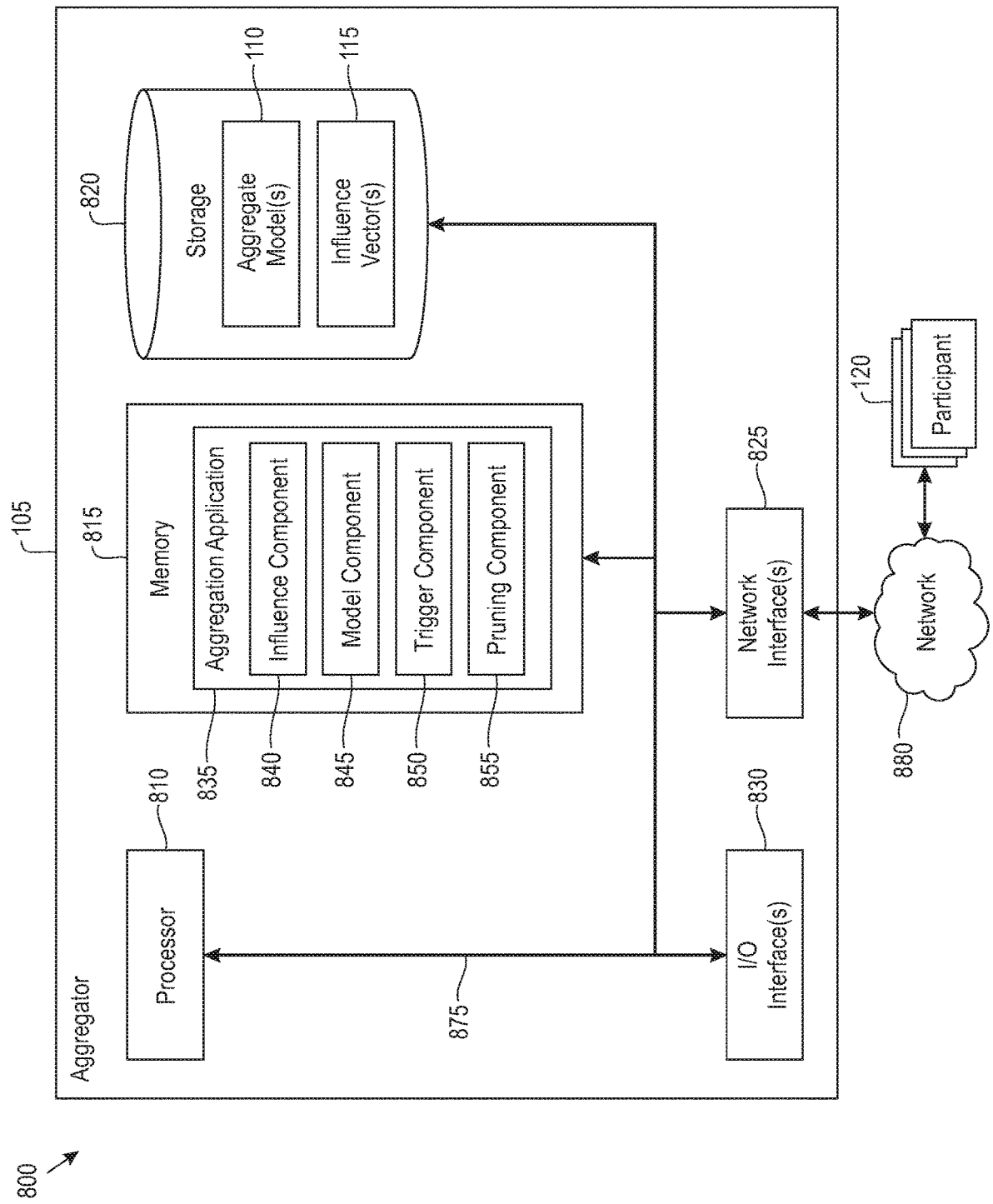
FIG. 8 is a block diagram illustrating an aggregator configured to dynamically evaluate and modify participant influence in a federated learning environment, according to one embodiment disclosed herein.

FIG. 8 is a block diagram illustrating an Aggregator 105 configured to dynamically evaluate and modify participant influence in a federated learning environment, according to one embodiment disclosed herein. Although depicted as a physical device, in embodiments, the Aggregator 105 may be implemented using virtual device(s), and/or across a number of devices (e.g., in a cloud environment). As illustrated, the Aggregator 105 includes a Processor 810, Memory 815, Storage 820, a Network Interface 825, and one or more I/O Interfaces 830. In the illustrated embodiment, the Processor 810 retrieves and executes programming instructions stored in Memory 815, as well as stores and retrieves application data residing in Storage 820. The Processor 810 is generally representative of a single CPU and/or GPU, multiple CPUs and/or GPUs, a single CPU and/or GPU having multiple processing cores, and the like. The Memory 815 is generally included to be representative of a random access memory. Storage 820 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 830. Further, via the Network Interface 825, the Aggregator 105 can be communicatively coupled with one or more other devices and components (e.g., via the Network 880, which may include the Internet, local network(s), and the like). In the illustrated embodiment, the Aggregator 105 is communicatively coupled with one or more Participants 120. As illustrated, the Processor 810, Memory 815, Storage 820, Network Interface(s) 825, and I/O Interface(s) 830 are communicatively coupled by one or more Buses 875.

In the illustrated embodiment, the Storage 820 includes a set of Aggregate Models 110 and a corresponding set of Influence Vectors 115. Each Influence Vector 115 is generally a multidimensional vector where each dimension/value indicates the weight of a corresponding Participant 120. In embodiments, these weights may be fractional, integer values, decimal values, or any combination thereof. In some embodiments, the weights in a given Influence Vector 115 sum to one. Each Aggregate Model 110 is generally an ML model (e.g., a neural network) generated by aggregating weights or other parameters provided by a plurality of Participants 120 using a corresponding Influence Vector 115.

As illustrated, the Memory 815 includes an Aggregation Application 835. Although depicted as software residing in Memory 815, in embodiments, the functionality of the Aggregation Application 835 may be implemented using software, hardware, or a combination of software and hardware. The Aggregation Application 835 includes an Influence Component 840, a Model Component 845, a Trigger Component 850, and a Pruning Component 855. Although depicted as discrete components for conceptual clarity, in embodiments, the operations of the Influence Component 840, Model Component 845, Trigger Component 850, and Pruning Component 855 may be combined or distributed across any number of components.

In an embodiment, the Influence Component 840 is generally configured to determine an influence weight for each Participant 120 and generate the Influence Vectors 115. In one embodiment, the Influence Component 840 initially uses equal weight for each Participant 120 when instantiating the system. In another embodiment, the Influence Component 840 identifies and evaluates other information for each Participant 120 (e.g., their reputation) and/or their local data (e.g., the number of training exemplars they can provide) to establish an initial weight for each. In one embodiment, when new influence vectors are required, the Influence Component 840 generates them. For example, the Influence Component 840 can identify the relevant existing Influence Vector(s) 115 that should be modified, and generate one or more new Influence Vectors 115 based on the identified prior vector(s). In some embodiments, the Model Component 845 generally uses the Influence Vector(s) 115 to aggregate model updates from the Participants 120 in order to generate Aggregate Models 110.

In an embodiment, the Trigger Component 850 is configured to determine whether one or more predefined trigger conditions have been satisfied at any given point. For example, the Trigger Component 850 may evaluate the model updates from each Participant 120 and identify outliers. Similarly, the Trigger Component 850 may evaluate the reply characteristics (e.g., the delay of each reply) to determine whether conditions may have changed at the Participant 120. Further, in some embodiments, the Trigger Component 850 can evaluate information from third parties to determine whether the party weights should be changed (e.g., based on a security alert for a given Participant 120). If so, the Trigger Component 850 can request that the Influence Component 840 generate new vector(s).

In some embodiments, the Pruning Component 855 generally evaluates the performance of each Aggregate Model 110, and prunes the lowest-performing models. In one embodiment, the Pruning Component 855 does so by transmitting the models to one on more Participants 120 and requesting that they use their local data to compute and return performance metrics for each. The Pruning Component 855 can then aggregate these replies to determine overall performance metric(s) of each Aggregate Model 110. In some embodiments, this aggregation includes computing a weighted average of the metrics reported by each Participant 120, based on the corresponding Influence Vector 115 for the Aggregate Model 110.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Aggregation Application 835) or related data available in the cloud. For example, the Aggregation Application 835 could execute on a computing system in the cloud and train/maintain aggregate models. In such a case, the Aggregation Application 835 could generate influence vectors, evaluate trigger conditions, and maintain aggregate models, and store the influence vectors and aggregate model parameters at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   issuing, by a computing device, one or more queries to a plurality of participants in a federated learning system;
   receiving a first set of replies from the plurality of participants;
   generating a first aggregated model based on the first set of replies, a first influence vector, and an initial model; and
   upon determining that a predefined criterion is satisfied, during a first epoch:
   generating a second influence vector modifying a weight of a first participant of the plurality of participants, generating a second aggregated model based on the first set of replies, the second influence vector, and the initial model, generating a third influence vector modifying a weight of a first participant of the plurality of participants, and generating a third aggregated model based on the first set of replies, the third influence vector, and an initial model; and upon determining that a number of aggregated models in a set of aggregated models, including the first, second and third aggregated models, exceeds a predefined maximum value, pruning one or more of the first, second or third aggregated models during a second epoch based on model performance.

2. The method of claim 1, wherein the first influence vector assigns equal weight to each of the plurality of participants, wherein the second influence vector assigns additional weight to the first participant, and wherein the third influence vector assigns less weight to the first participant.

3. The method of claim 1, wherein determining that the predefined criterion is satisfied comprises identifying a change in one or more conditions of the first participant based on a reply from the first participant.

4. The method of claim 1, wherein determining that the predefined criterion is satisfied comprises receiving, from a third party, new information about the first participant.

5. The method of claim 1, wherein determining that the predefined criterion is satisfied comprises determining that a reply from the first participant is an outlier, as compared to replies from other participants in the plurality of participants, wherein determining that the reply from the first participant is an outlier comprises:

comparing the reply from the first participant to the replies from the other participants; and determining that a difference between the reply from the first participant and the replies from the other participants exceeds a predefined threshold.

6. The method of claim 1, wherein determining that the predefined criterion is satisfied comprises determining that a reply from the first participant is an outlier, as compared to replies from the first participant, wherein determining that the reply from the first participant is an outlier comprises:

comparing the reply from the first participant to a last reply from the first participant; and determining that a difference between the reply from the first participant and the last reply from the first participant exceeds a predefined threshold.

7. The method of claim 1, wherein evaluating each respective aggregated model comprises:

transmitting, to at least one participant of the plurality of participants, the set of aggregated models; and requesting that the at least one participant evaluate the set of aggregated models using local data.

8. One or more computer-readable storage media collectively containing computer program code that, when executed by operation of one or more computer processors, performs an operation comprising:

issuing one or more queries to a plurality of participants in a federated learning system;

receiving a first set of replies from the plurality of participants;

generating a first aggregated model based on the first set of relies, a first influence vector, and an initial model; and upon determining that a predefined criterion is satisfied, during a first epoch:

generating a second influence vector modifying a weight of a first participant of the plurality of participants, generating a second aggregated model based on the first set of replies, the second influence vector, and the initial model, generating a third influence vector modifying a weight of a first participant of the plurality of participants, and generating a third aggregated model based on the first set of replies, the third influence vector, and an initial model; and upon determining that a number of aggregated models in a set of aggregated models, including the first, second and third aggregated models, exceeds a predefined maximum value, pruning one or more of the first, second or third aggregated models during a second epoch based on model performance.

9. The computer-readable storage media of claim 8, wherein the first influence vector assigns equal weight to each of the plurality of participants, wherein the second influence vector assigns additional weight to the first participant, and wherein the third influence vector assigns less weight to the first participant.

10. The computer-readable storage media of claim 8, wherein determining that the predefined criterion is satisfied comprises determining that a reply from the first participant is an outlier, as compared to replies from other participants in the plurality of participants, wherein determining that the reply from the first participant is an outlier comprises:

comparing the reply from the first participant to the replies from the other participants; and determining that a difference between the reply from the first participant and the replies from the other participants exceeds a predefined threshold.

11. The computer-readable storage media of claim 8, wherein determining that the predefined criterion is satisfied comprises determining that a reply from the first participant is an outlier, as compared to replies from the first participant, wherein determining that the reply from the first participant is an outlier comprises:

comparing the reply from the first participant to a last reply from the first participant; and determining that a difference between the reply from the first participant and the last reply from the first participant exceeds a predefined threshold.

12. The computer-readable storage media of claim 8, wherein evaluating each respective aggregated model comprises:

transmitting, to at least one participant of the plurality of participants, the set of aggregated models; and requesting that the at least one participant evaluate the set of aggregated models using local data.

13. A system comprising:

one or more computer processors; and one or more memories collectively containing one or more programs which when executed by the one or more computer processors performs an operation, the operation comprising:

issuing one or more queries to a plurality of participants in a federated learning system;

receiving a first set of replies from the plurality of participants;

generating a first aggregated model based on the first set of relies, a first influence vector, and an initial model; and upon determining that a predefined criterion is satisfied, during a first epoch:
   generating a second influence vector modifying a weight of a first participant of the plurality of participants,
   generating a second aggregated model based on the first set of replies, the second influence vector, and the initial model,
   generating a third influence vector modifying a weight of a first participant of the plurality of participants, and
   generating a third aggregated model based on the first set of replies, the third influence vector, and an initial model; and upon determining that a number of aggregated models in a set of aggregated models, including the first, second and third aggregated models, exceeds a predefined maximum value, pruning one or more of the first, second or third aggregated models during a second epoch based on model performance.

14. The system of claim 13, wherein the first influence vector assigns equal weight to each of the plurality of participants, wherein the second influence vector assigns additional weight to the first participant, and wherein the third influence vector assigns less weight to the first participant.

15. The system of claim 13, wherein determining that the predefined criterion is satisfied comprises determining that a reply from the first participant is an outlier, as compared to replies from other participants in the plurality of participants, wherein determining that the reply from the first participant is an outlier comprises:
   comparing the reply from the first participant to the replies from the other participants; and
   determining that a difference between the reply from the first participant and the replies from the other participants exceeds a predefined threshold.

16. The system of claim 13, wherein determining that the predefined criterion is satisfied comprises determining that a reply from the first participant is an outlier, as compared to replies from the first participant, wherein determining that the reply from the first participant is an outlier comprises:
   comparing the reply from the first participant to a last reply from the first participant; and
   determining that a difference between the reply from the first participant and the last reply from the first participant exceeds a predefined threshold.

17. The system of claim 13, wherein evaluating each respective aggregated model comprises:
   transmitting, to at least one participant of the plurality of participants, the set of aggregated models; and
   requesting that the at least one participant evaluate the set of aggregated models using local data.

\* \* \* \* \*